Sept. 7, 1965 R. EICKEMEYER 3,204,563
ROTARY PISTON ENGINES
Filed May 1, 1961 8 Sheets-Sheet 1

FIG.1.

INVENTOR
Rudolf Eickemeyer
BY
Baldwin & Wight
ATTORNEYS

FIG. 2.

INVENTOR
Rudolf Eickemeyer
BY Baldwin & Wight
ATTORNEYS

Sept. 7, 1965  R. EICKEMEYER  3,204,563
ROTARY PISTON ENGINES
Filed May 1, 1961  8 Sheets-Sheet 4

INVENTOR
Rudolf Eickemeyer
BY Baldwin & Wight
ATTORNEYS

Sept. 7, 1965     R. EICKEMEYER     3,204,563
ROTARY PISTON ENGINES
Filed May 1, 1961                                          8 Sheets-Sheet 6

INVENTOR
Rudolf Eickemeyer
BY Baldwin & Wight
ATTORNEYS

Sept. 7, 1965  R. EICKEMEYER  3,204,563
ROTARY PISTON ENGINES

Filed May 1, 1961  8 Sheets-Sheet 8

INVENTOR
Rudolf Eickemeyer
BY Baldwin & Wright
ATTORNEYS

ROTARY PISTON ENGINES
Rudolf Eickemeyer, Torwangerstrasse 10,
Munich, Germany
Filed May 1, 1961, Ser. No. 106,635
Claims priority, application Germany, May 3, 1960,
E 19,281
18 Claims. (Cl. 103—120)

A large number of rotary piston machines, i.e. fluid pressure pumps or engines of different construction are known. Between the individual chambers of such engines separated by pistons either only linear contact is obtained with positively driven pistons or else a surface contact is ensured only with the aid of springs or auxiliary centrifugal forces which result in increase in wear. Where the piston means is positively driven it becomes necessary to depart from the much desired circular form of the casing or of the piston and to use curved forms very complicated and very difficult to produce. Moreover they possess the further disadvantage that each machine can be built only for a quite definite piston stroke which cannot be adjusted.

It has now been found that all these disadvantages of known rotary piston engines can be avoided in an exceedingly simple and excellent manner by a fundamentally novel construction. In a construction in which a shaft rotates in a stationary casing the essential feature of the invention consists in this, that two or four or a higher even number of ring section shaped chambers preferably of rectangular cross section are formed by a cylindrical casing enclosing three sides and rotating about an axis, by an angularly rotating cylindrical piston carrier rotating about a second eccentric axis within it and by diametrically extending pistons which are entrained by the correspondingly slotted piston carrier rotating about the driven or driving axis in a stationary outer casing provided on its periphery with inlet and outlet branches for the driving medium and during the rotary movement slide while acting as a packing on plane surfaces provided on the inside of the annular casing rotating therewith, laterally projecting plane surfaces being produced on at least one of the pistons at right angles to its central plane which, sliding on corresponding plane faces of the eccentrically mounted annular casing, drive this angularly.

In a kinematic reversal of this arrangement i.e. in an arrangement where the casing rotates about a stationary shaft the invention is characterized by this that two or four or a higher even number of annular section shaped chambers preferably of rectangular cross section are formed by a driving or driven cylindrical casing enclosing it on three sides and rotating about a stationary axis, by an angularly rotating ring of circular cross section rotating about a second eccentric axis of circular section inside it and by diametrally extending pistons which are entrained by corresponding guide slots in the casing rotating about the stationary axis and serving for the supply and exhaust of the driving medium, with the rotating ring provided with an eccentric ring part formed as a bearing for the inner ring to slide on plane surfaces in the manner of a packing during the rotation on the inner ring provided with ports, laterally extending plane surfaces being provided on at least one of the pistons at right angles to its central plane, which drive through corresponding plane surfaces on the eccentrically mounted inner ring.

Both forms embody the same principle of construction which is hereinafter explained with the aid of the accompanying drawings.

In the construction in which the shaft rotates variation of the piston stroke is obtained according to the invention by this that the stationary casing carries only bearings for the rotating annular casing and is shiftable within an outer casing by means of an external spindle extending through a stuffing box, the connecting branches to the casing sliding in oppositely disposed stuffing boxes and the driven or driving shaft being mounted in the outer casing by means of inclined roller bearings. There is preferably provided in the casing an interchangeable sleeve for the annular casing rotating therein. This sleeve, or a rotating ring in the embodiment having a rotating casing, presents slots which for fluid driving media occupy as large as possible a part of the periphery of the casing of the rotating ring and for gaseous driving media are dimensioned corresponding to the desired compression ratio. The corresponding slots of the rotating part or parts sliding on the sleeve or on the rotating ring are relatively large with minimum packing surface overlap for fluid driving media and relatively small in order to obtain the maximum compression ratio for gaseous driving media.

In the embodiment having a rotating shaft, for the purpose of adjusting the desired eccentricity of the pistons there is secured to the casing a spindle extending at right angles to the shaft which is guided through the outer casing and provided with a screw thread. On the outer casing there is flanged a nut engaging in the spindle thread with a handwheel and an indicator showing the piston stroke.

It is preferred to provide two pistons the breadth of which at their ends corresponds to the rotating circular piston carrier and which extend through the piston carrier slots at an angle of 90°, the one being fork-shaped at its central part and the other being composed of two parts with its central bar extending between its forked portions.

The forked part of the one piston is preferably of the same weight as the central bar of the other. Moreover both pistons at least at one outer edge or at both outer edges are provided with two diametrically arranged cross bars of equal mass with plane surfaces for driving the annular casing. Thus, the weight of the two pistons is equal and axially symmetrically distributed. This matter will be explained further with reference to FIG. 5.

Finally, the rotary piston engine can be provided with a cooling jacket for water cooling or with cooling ribs for air cooling. In the embodiment in which the shaft rotates and the piston stroke is adjustable the outer casing provided may serve also as the water jacket.

The novel construction is suitable for various applications set forth hereinafter. The engine may be used for delivering liquids against preferably high pressure. Conversely it can also be used as a driving motor for suitable purposes by introducing a fluid under pressure. In consequence of the surface-like form of packing of the individual pressure chambers extremely high differences in pressure can be overcome in the new engine even at very low speeds of rotation.

The combination of such a fluid pump having an adjustable stroke with an engine serving as a driving motor and without adjustable stroke provides thus the ideal continuously regulatable fluid drive. With suitable shape of the slots the engine can be used as a vacuum pump or compressor. Similarly it can be used as an expansion engine for gases and/or vapours for driving purposes.

Finally the combination of a rotary piston engine in accordance with the invention serving as a compressor with one serving as an expansion engine if desired with an interposed stationary combustion chamber located externally of the engine may be used to provide a continually operating combustion engine. The expansion engine is made larger corresponding to the increase in volume on combustion, for instance is made wider than the compressor coupled in suitable manner therewith.

According to a particularly satisfactory embodiment water is sprayed into the combustion chamber interposed between the compression and the expansion engine for direct cooling purposes, which water preferably to a large extent is recovered as condensate in the cooler beyond the expansion engine and is returned to the combustion chamber by means of a pump which preferably consists also of a rotary piston engine.

The fluid or even gaseous driving medium can be sprayed either by means of a rotary piston engine direct into the combustion chamber or can be introduced in suitable manner through a carburetor into the combustion air and compressed therewith.

For the purpose of saving materials a compression rotary piston and an expansion rotary piston can be rigidly coupled in a common casing with suitable cooling, an ignition means being provided if desired at the junction between the compression and the expansion piston so that every rotation of the combined engine in each pair of chambers (for compression and expansion) provides a full working cycle consisting of suction, compression, ignition, expansion and exhaust. Also in this arrangement with particular advantage of a low temperature demand of the engine a combustion chamber adapted to be cooled directly or indirectly can be provided externally thereof to which the outlet conduit of the compressor part and the inlet conduit of the expansion part can be connected.

In the use of the new engine as a fluid drive as well as in its use for compression and/or expansion of gaseous media it is particularly advantageous in order to provide further reduction of the sliding friction to add to the driving fluid or the lubricating oil molybdenum disulphide or an equivalent lubricating medium in the desired concentration.

Various embodiments of a rotary piston engine machine in accordance with the invention as well as their applications are explained by way of example in FIGS. 1 to 16 of the accompanying drawings.

FIGURE 3 is a section through an engine having a rotating casing on the line III—III of FIGURE 4, while FIGURE 4 is a section on the line IV—IV of FIGURE 3.

FIGURES 6a and b are details of the shaft.

FIGURES 7a and b are details of a piston with the forked member.

FIGURES 8a and b are details of a piston with the middle bar.

FIGURES 9a and b show the annular casing in sections at right angles

All these views are details of the construction employing a rotating shaft.

FIGURES 11a and b show the stationary shaft.

FIGURES 13a and b show a piston for balancing the weight.

All these views are details of the construction employing a rotating casing.

Figure 1:
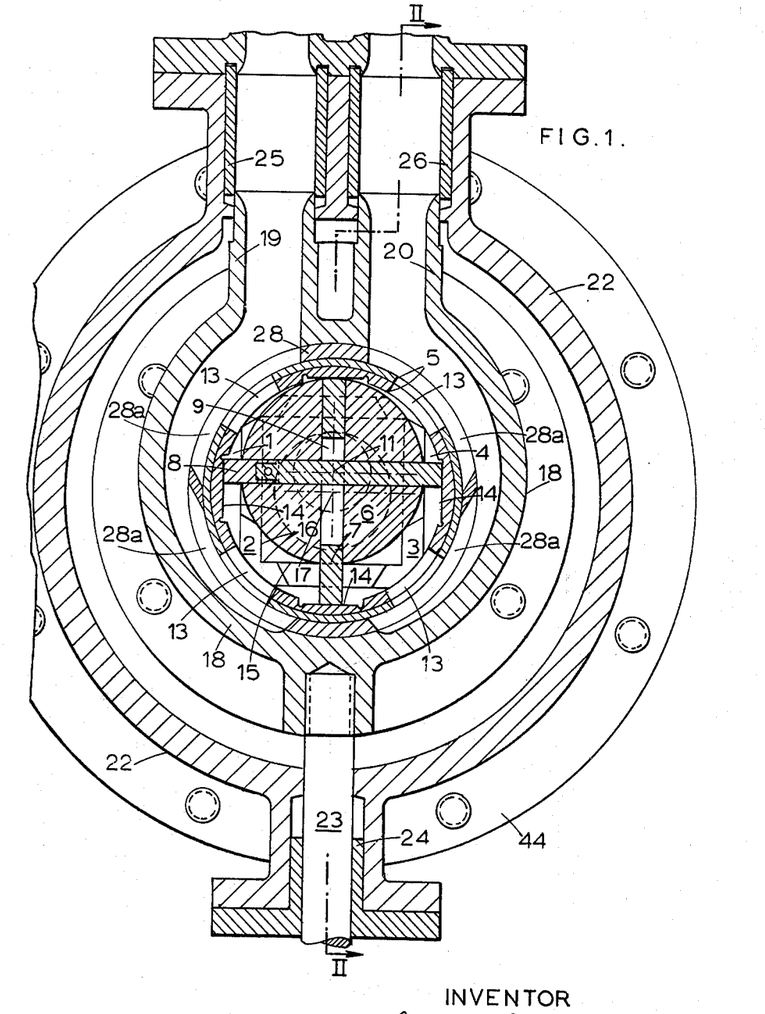
FIG. 1 is a section through an engine having a rotating shaft on the line I—I of FIGURE 2.
Figure 2:
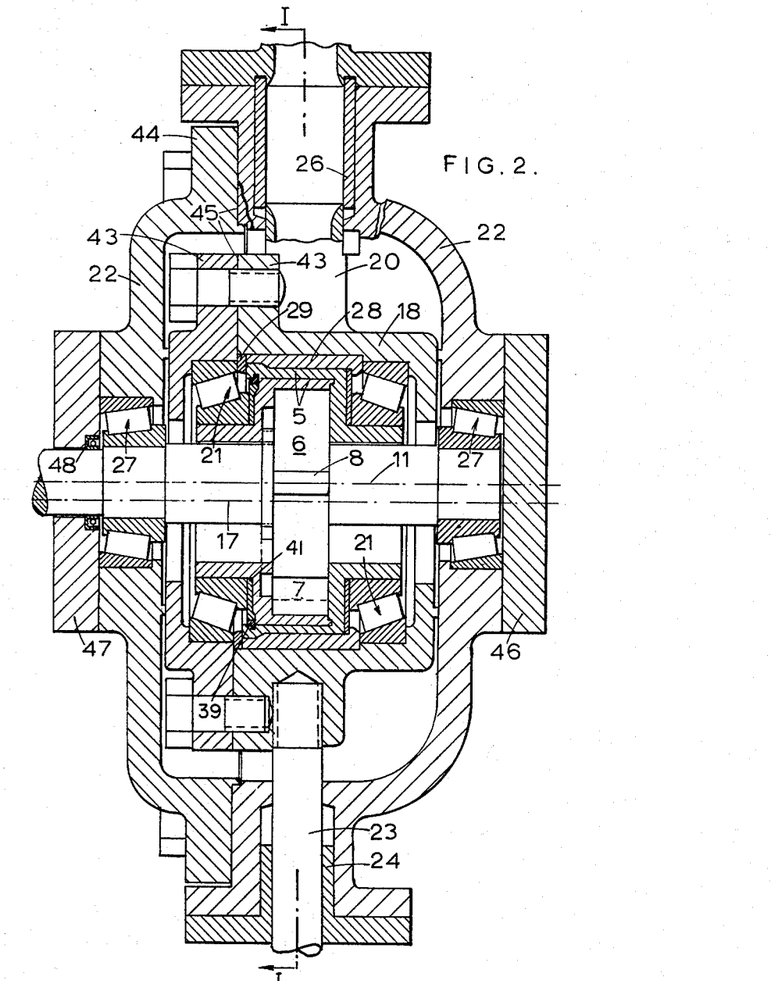
FIGURE 2 is a section on the line II—II of FIGURE 1.
Figures 6A, 6B:
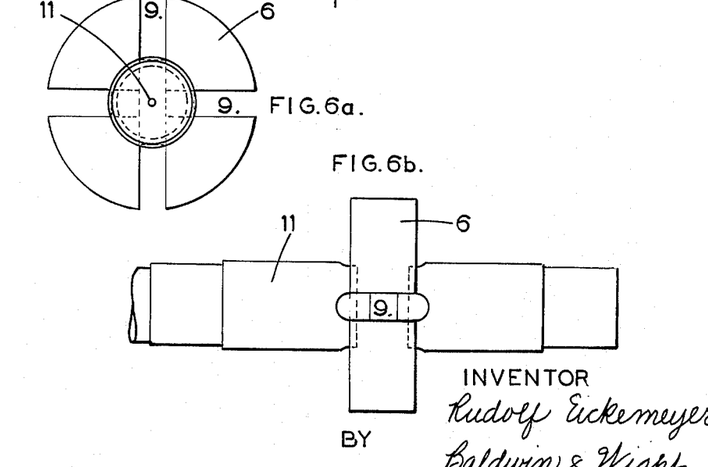

As is shown in FIGS. 1, 2 and 6a and b to 10a and b, the arcuate chambers 1–4 of the rotary piston engine having a rotating shaft are formed by the cylindrical casing element 5 surrounding it on three sides, by a cylindrical piston carrier element 6 rotating angularly inside it and by diametrally extending pistons 7 and 8. The arcuate chambers collectively form a ring. The pistons are guided in slots 9 in the piston carrier 6 which is rigidly connected with the driven or driving shaft 11. The annular casing 5 is provided on its periphery with ports 13 for the driving medium and is provided on the inner side with plane surfaces 14 on which the end faces of the pistons 7 and 8 slide in fluid tight manner during the rotary movement. The pistons carry at right angles to the central plane laterally extending cros sbars with plane surfaces 15 which drive on corresponding plane surfaces 16 in grooves in the annular casing 5 mounted eccentrically with respect to the axis 17 of the relatively stationary casing 18. The stationary casing 18 has inlet branch passage 19 and outlet branch passage 20 for the driving medium.

In the embodiment having an adjustable stroke in accordance with FIGS. 1 and 2, the casing 18 carries only conical roller bearings 21 for the annular casing 5. The casing 18 is movable in an outer casing 22 by means of a spindle 23 which extends outwards through a stuffing box 24. On displacement of the casing 18 the branches 19 and 20 slide in corresponding bushes 25 and 26 in the outer casing 22. The shaft 11 is mounted in the latter by means of conical roller bearings 27.

Figure 10A:
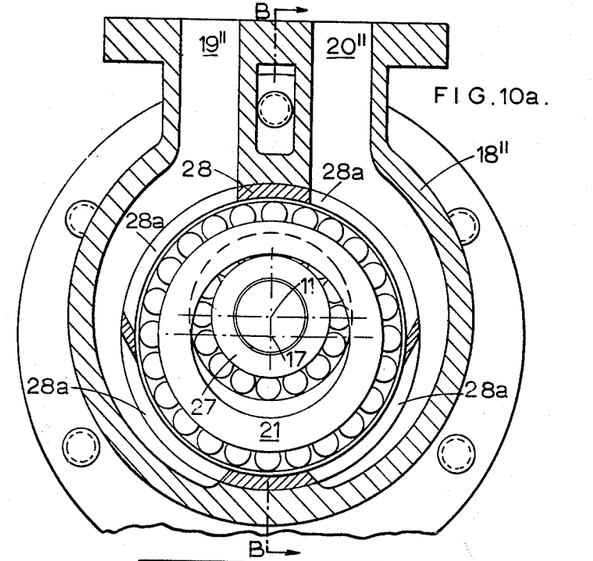
FIGURES 10a and b show the stationary casing in two sections at right angles.
Figure 10B:
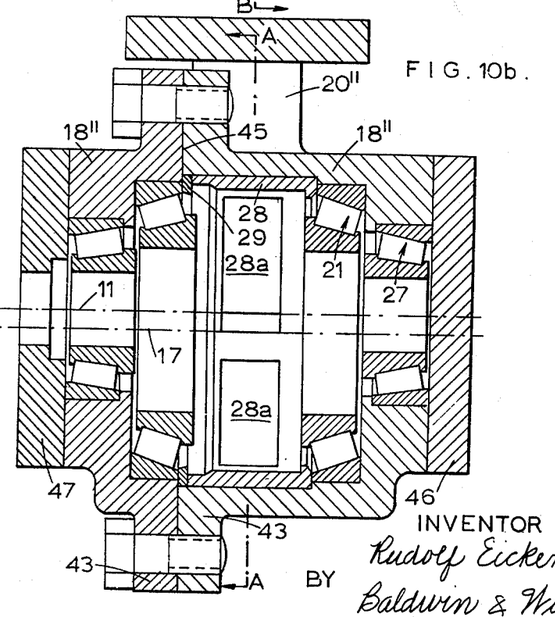
Figure 12A:
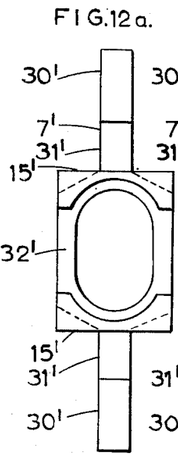
FIGURES 12a and b show a piston with the cross bar plane surfaces.
Figures 12B, 13A, 13B:
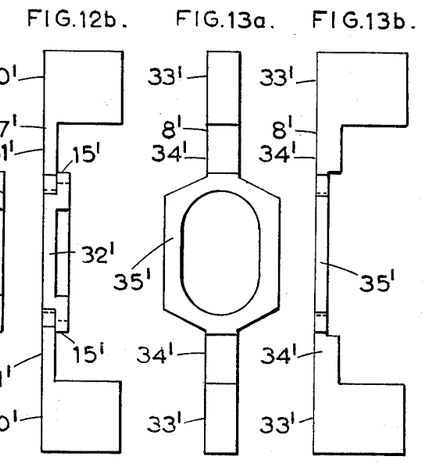
Figure 14A:
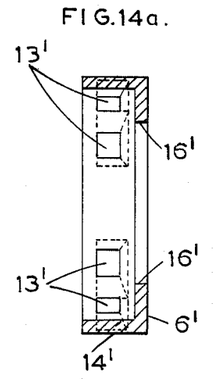
FIGURES 14a and b show in detail, respectively in cross section and in elevation, a ring forming part of the construction shown in FIGURES 3 and 4.
Figure 14B:
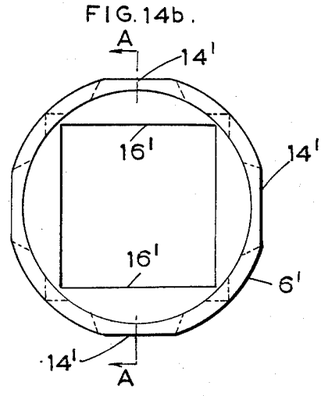

In the embodiment which does not have an adjustable stroke the outer casing 22 is dispensed with and the casing 18″ as is clear from FIGS. 10a and b carries not only the conical roller bearings 21 for the annular casing 5 but also the conical bearings 27 for the shaft 11. In this case, the casing 18″ is stationary, and the inlet and outlet branches 19″ and 20″ are not slidable as in the structure shown in FIGS. 1 and 2, but are formed in the stationary casing 18.

Figures 7A, 7B, 8A:
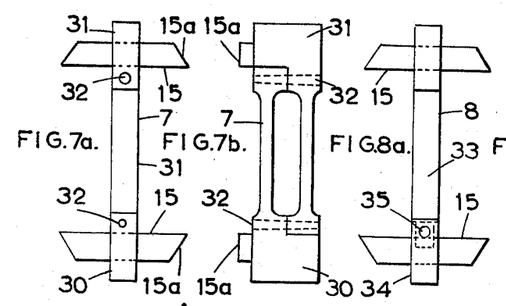

In the casing 18 or 18″ is fitted a sleeve 28 fitting the annular casing 5 and provided with slots 28a which is applied to the ring 29 after insertion of the internal parts. The shaft 11 with the slotted piston carrier 6 is shown separately in FIGS. 6a and b. The pistons 7 and 8 are shown in FIGS. 7a and b and 8a and b. The piston 7 is assembled by means of pins 32 from two parts 30 and 31 which each form an end of the piston 7 with a cross bar 15a and one bar of the forked member.

Figure 8B:
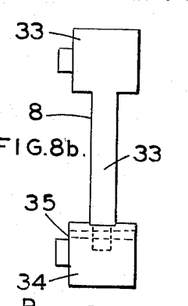

The piston 8 is also in two parts. The middle bar connected with the one end of the bar 33 is joined with the other end 34 and secured by a pin 35. The pistons are assembled only after insertion of their parts in the slots 9 in the piston carrier 6. The slides can naturally be constructed in another manner and mounted in the piston slots.

Figures 9A, 9B, 11A, 11B:
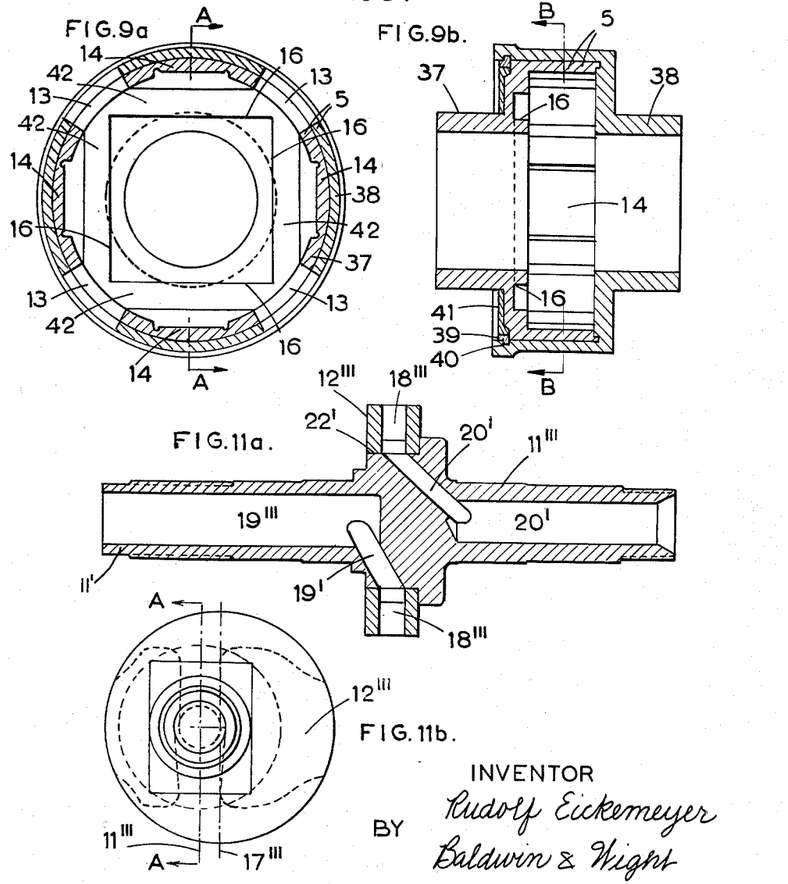

The annular casing element 5 shown in FIGURES 9a and b is formed of two parts 37 and 38 which after insertion of the pistons in the piston carrier element 6 are pushed over the latter from both sides and held by means of a ring 39. The ring fitted from the inside in a corresponding groove on the outer part 38 of the casing is secured by a ring 41 which also permits the axial accommodation of the conical roller bearing 21. The part 37 of the casing on the side facing the piston carrier 6 is provided with the grooves 42 with the plane surfaces 16 co-operating with the plane surfaces 15. The cross bars 15a are so fitted in the grooves 42 that they provide sufficient relative tightness of the chambers 1–4. The casing 18 or 18″ is in two parts and screwed together by means of flanges 43 in order to permit of insertion of the internal parts. The outer casing 22 is correspondingly divided and held together by means of flanges 44. It is of particular advantage that the separating faces of the two pairs of flanges 43 and 44 are arranged in the same plane. The outer casing 22 or the casing 18″ is closed on the one side by means of the cover 46 for the bearing 27 while on the other side the shaft extends through the cover flange 47, the operating clearance between the shaft and the flange 47 being maintained fluid tight by means of a ring 48, the shaft serving for driving purposes.

Figure 15:
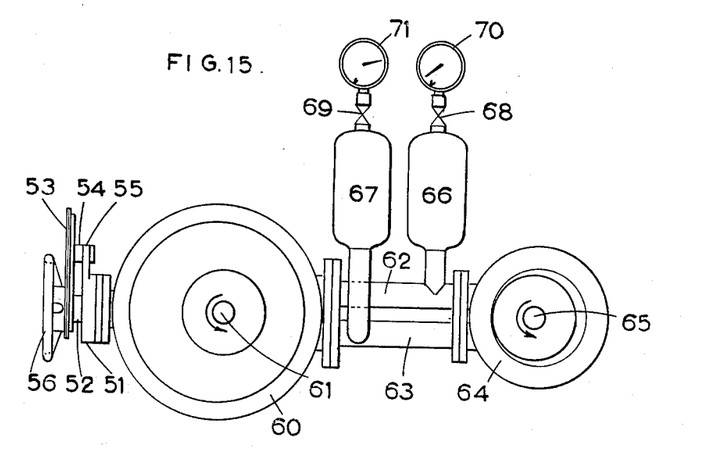
FIGURE 15 shows the construction of a continuously regulatable fluid drive.

The adjustment of the spindle 23 (cf. FIGS. 1 and 2)

for regulating the eccentricity of the axis 17 of the annular casing 5 in relation to the shaft 11 from zero to a maximum is effected by means of the bush 52 rotatable by means of the flange 51 and rotatable on the flange of the outer casing stuffing box 24 as shown in FIG. 15. The position of the spindle 23 and of the adjusted piston stroke can be read off on an annular scale of a pinion rotating in the casing 53. This pinion is mounted on a stud 54 which is secured to a projection 55 on the flange 51. It is driven by a pinion secured to the nut 52 also rotating in the casing in the ratio of 1:2 so that one rotation of the scale pinion about the corresponding marking on the casing is sufficient to cover the total range of stroke adjustment which in this case is 20% of the external diameter of the piston.

In contradistinction to the arrangement of the rotary piston engine with the rotating shaft an embodiment employing a rotating casing will now be described in detail with reference to FIGS. 3, 4, and 11a and b to 14a and b.

The ring or arcuate section shaped chambers 1'-4' are in this construction formed by the rotating cylindrical piston carrying casing element 5' enclosing three sides, by an angularly rotating ring element 6' on the inner side and by diametrally extending pistons 7' and 8'. The latter are entrained by corresponding guide slots 9' in the casing or carrier 5' which is driven or driving and rotates about the stationary axle 11'. The bearing ring 12' is eccentrically mounted on the hollow axle 11' serving for the supply and exhaust of the driving medium in a position corresponding to the desired stroke. About the bearing ring 12' rotates the inner ring 6' with ports 13' for the driving medium and with plane surfaces 14' on the periphery on which the packing surfaces of the pistons 7' and 8' slide during the rotary movement. For engagement with the piston 7' at right angles to its central plane there are laterally extending plane surfaces 16' formed on the eccentrically mounted inner ring 6' so as to be rotatable angularly about the axis 17'. The driving medium is supplied as indicated in FIG. 4 at the left by way of a bore 19' in the stationary shaft or axle 11' leading to a corresponding bearing ring slot 18' and into the connected chambers 1', 2', 3', and 4', while exhaust takes place through the bore 20' of the axle 11'.

For the mounting of the rotating casing 5' on the stationary axle 11' ball bearings 21' acting both radially and axially are shown.

Figures 3, 4:
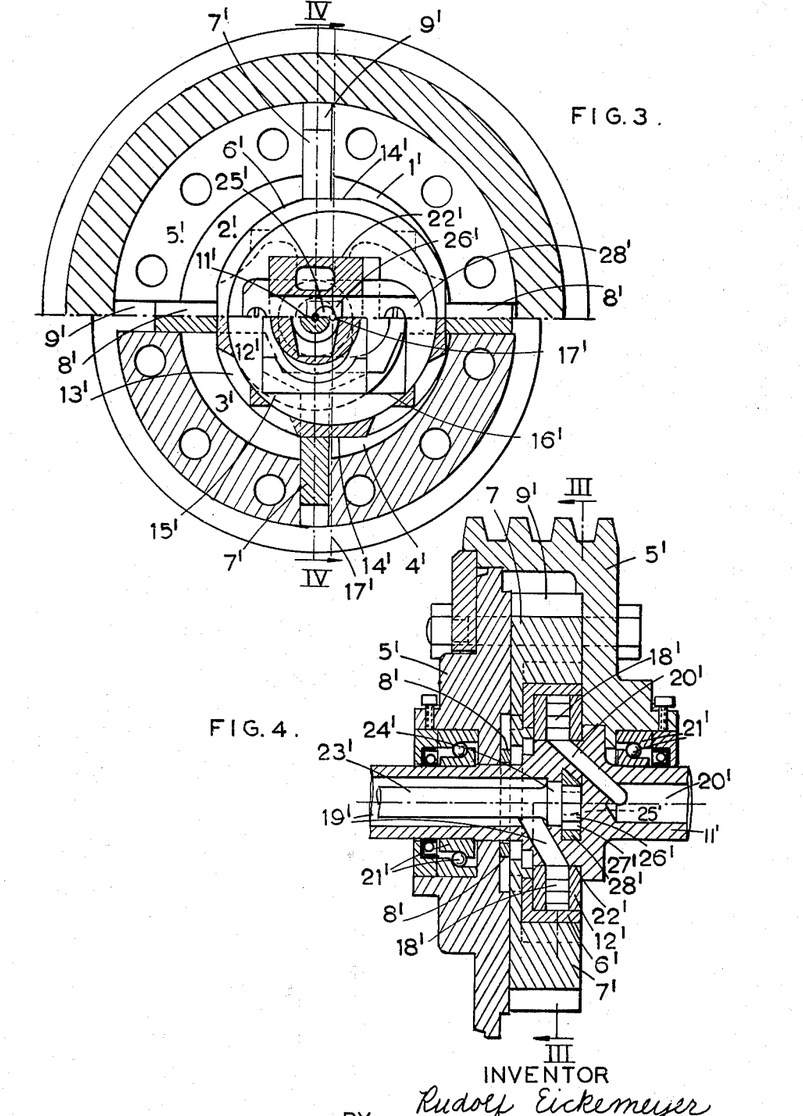

In the embodiment providing an adjustable stroke according to FIGS. 3 and 4 the bearing ring 12' is movable on corresponding plane surface 22' of the axle 11' at a right angle to the axis of the axle 11'. The displacement is effected by means of a spindle 23' which extends through a stuffing box (not shown) from the axle bore 19' and is movable by means of an irreversible worm drive. At its inner end the spindle 23' is mounted at 24' on the stationary shaft 11' and carries an eccentric cam 25'. The latter runs in a block 26' which is movable in a slot 27' in the part 28' secured to the bearing ring 12'. The eccentricity of the cam 25' in relation to the spindle 23' is such that one half revolution of the latter from the zero position provides the maximum piston eccentricity of in this case 15% of the half external diameter of the ring 6'.

Referring to FIGS. 11a and 11b, in the embodiment which does not have an adjustable stroke the bearing ring 12''' is pressed without play on the plane surfaces 22' of the axle 11''', the eccentricity of the axis 17' relative to the axle 11''' corresponding to the above maximum stroke amounting to 15% of the half external diameter of the ring 6'. The parts 23' to 28' shown in FIGS. 3 and 4 are dispensed with thus affording a corresponding simplification also of the stationary axle 11' to 11''' (see FIGS. 11a and b). The pistons 7' and 8' are illustrated in detail in FIGS. 12a and b and 13a and b. Both are made in one piece. The ends 30' of one piston 7', guided in the rotating casing 5', are connected by bars 31' and a forked part 32' embracing the axle 11'. On the part 31' are provided the plane surfaces 15' which slide on a corresponding plane surface 16' of the ring 6' driving this during the rotary movement. The piston 8' is correspondingly formed from the ends 33', the bars 34' and the forked part 35'. The bars 31' and 34' run in corresponding grooves in the rotating casing 5' so that their surfaces facing the pistons are flush with the inner surface of the casing 5'. The ring 6' is shown in detail in FIGS. 14a and b. Its inner periphery slides on the bearing ring periphery. For heavier loads a roller bearing, preferably a needle bearing, is provided for the ring 6' on the piston 12'.

Following the detailed description of the different constructions of this new rotary piston engine, its geometrical basic conception will now be discussed with the aid of FIG. 5. The pivot of the piston is indicated at "$a$" while the pivot of the annular casing 5 or of the ring 6' is indicated at "$b$." In four different positions of rotation succeeding one another the pistons at right angles to one another $k_1/k_1'$, $k_2/k_2'$, $k_3/k_3'$ and $k_4/k_4'$ are shown. The dotted line $t_1/t_1'$, $t_2/t_2'$, $t_3/t_3'$, and $t_4/t_4'$ are parallel to the pistons and pass through the pivot "$b$." The diameter of the circle R corresponds to the distance apart of the packing faces of the pistons in both embodiments. The diameter of the circle $r$ corresponds to the distance apart $e$ of the pivots $a$ and $b$, i.e., to the eccentricity of the axis 17 or 17' in relation to the axis 11 or 11'. The tangents from the end points of the lines of the pistons to the circle R are indicated by $s_{1-4}/s'_{1-4}$. The latter denote the parallel displacement of the piston packing surfaces on the rotary movement on the plane surfaces 14 or 14' of the annular casing 5 or of the ring 6'.

The centres of gravity $S_{1-4}$ of the pistons $k_{1-4}$ lie diametrally opposite the centres of gravity $S'_{1-4}$ of the pistons $k'_{1-4}$ as indicated by the dotted lines. The forces produced by the movement of the pistons $k$ and $k'$ balance one another as they have the same weight. The actual movement of the packing surfaces is indicated by the outer dotted relatively complicated curve F. The reduction of this complicated curve to purely circular and straight line movements is a very surprising result.

Figure 5:
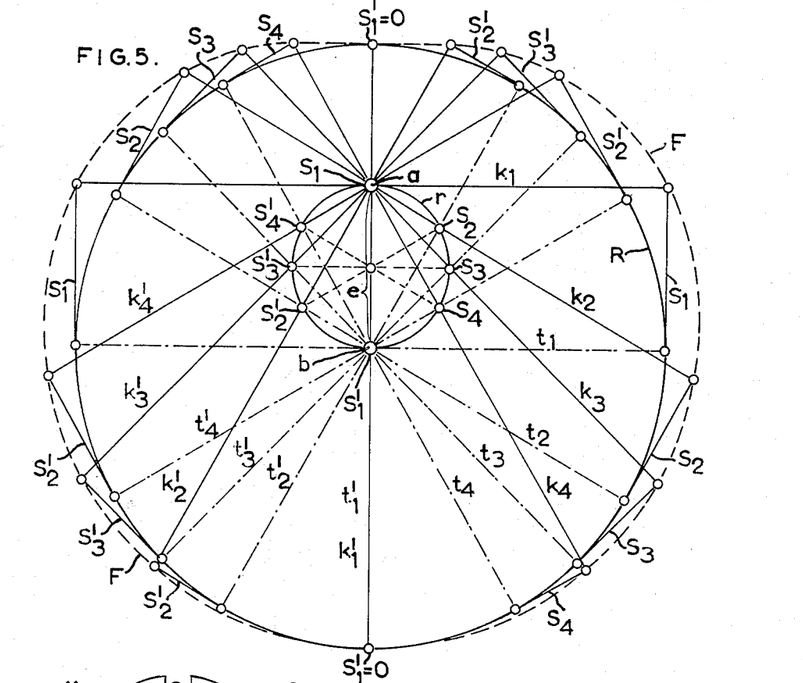
FIGURE 5 is a diagram illustrating the geometric basic conception of the new rotary piston engine.

The illustration in FIG. 5 differing from the embodiments is selected in order to indicate the geometrical connection particularly clearly. In practice, the maximum piston stroke is not much more than 20% of the piston or ring diameter. The construction having a rotating shaft is preferable to that having a rotating casing particularly for large units as the former is not limited to the width of the piston on the shaft cross section which in the latter determines the mean output.

The technical advance obtained by the present invention can be summed up as follows: In the simplest construction from five basic structural parts of which the working surfaces are either circular or plane, the wear limited by sliding friction by the use of roller bearings and by the considerable reduction of the friction path of the packing faces sliding on one another can be reduced to about 5 to 10% of that of known rotary piston engines. Due to the favourable circular flow of the driving medium, the losses due to flow are reduced to a minimum. The new engine moreover operates absolutely free from vibration and noiselessly by reason of the total internal balancing of the weights.

In consequence of the surface-like packing in contradistinction to linear packing of the chambers, the engine can operate independently of its speed of rotation against high and maximum pressures, the continuous regulatability of the piston stroke considerably increasing its adaptability to the most difficult operating conditions.

FIG. 15 serves to explain the ideal fluid drive resulting from the use of the engine of the invention. A rotary piston engine 60 with a suitably driven shaft 61 the construction 51–56 of which for stepless variation of the stroke has been explained above forces the operating oil flowing through the tube 62 through the tube 63 into the rotary piston engine 64 driven as a fluid motor. The oil flowing out of the latter passes through the conduit 62 back into the engine 60. The shaft 65 of the engine 64 thus acts as a secondary shaft of the fluid drive which, by means of the hand wheel 56, permits adjustment to a suitable speed of rotation from zero to that of the shaft 61. To the conduits 62–63 are connected air chambers 66–67 which provide elastic coupling between the primary shaft 61 and the secondary shaft 65.

The pressure difference corresponding to the torque transmitted can be measured on the pressure gauges 70–71 connected through the valves 68–69. It is essential that even at very low speeds of rotation particularly high torques can be transmitted to the secondary shaft. As a result the possibility is afforded of starting under load working machines or vehicles making use of rapidly rotating driving motors.

Figure 16:
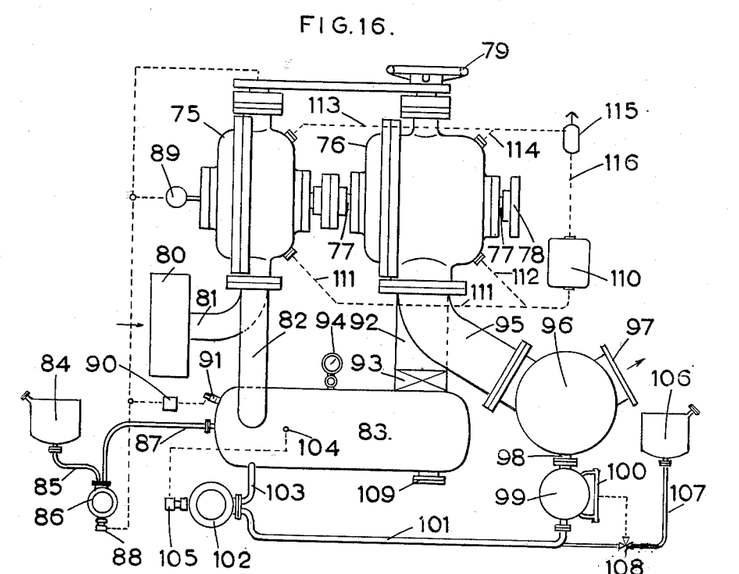
FIGURE 16 shows the application of the new piston engine for the construction of combustion engines.

FIG. 16 shows the construction of a continuously operating combustion engine in accordance with the invention making use of the rotary piston engine described.

The rotary piston engine 75 serves as a compressor and is driven by the correspondingly larger rotary piston engine 76 acting as an expansion engine. The shaft 77 of the latter thus serves for driving the compressor 75 and also for driving the working machine or vehicle at the coupling 78. The stroke of the compressor 75 and that of the expansion engine 76 are separately and selectively regulatable by means of the hand wheel 79. The compressor 75 draws in combustion air through air filter 80 and conduit 81 and delivers compressed air through conduit 82 to the stationary combustion chamber 83. Fluid fuel of suitable kind is sprayed from the tank 84 through the conduit 85 into the combustion chamber 83 by means of rotary piston engine 86 acting as a small high pressure pump. The supply is regulated, if desired, by automatic stroke adjustment in the device 88 which also can be connected to the speed regulator through the tachometer 89 (shown dotted). In order to initiate combustion current is supplied to a sparking plug 91 in the combustion chamber through a suitable relay 90. In the conduit 92 connecting the combustion chamber to the expansion engine 76 for starting a suitable closing device 93 is provided which is opened only when a sufficient pressure exists in the chamber 83 which is determined by the pressure gauge 94. This pressure during operation is an exact measure of the load of the combustion engine.

The expanded combustion gases leave the expansion engine 76 through the conduit 95 and pass by way of the condenser 96 and branch 97 into the atmosphere. The condensed water flows through the branch 98 through the collecting vessel 99 having a liquid level indicator 100, by way of the conduit 101 to the high pressure pump 102 which for direct cooling supplies condensate through the conduit 103, according to the temperature in the chamber 83 determined by means of a thermometer 104 and a relay 105, water being sprayed tangentially into the combustion chamber. The greatest part of the water can thus be kept in circulation. The water discharged at 97 is replaced from the water tank 106 by way of conduit 107 and level regulator 108 for the container 99.

In lieu of the arrangement of high pressure fuel pump 86 shown it is naturally also possible to introduce fuel by way of a carburetor into the combustion air drawn in say in the conduit 81 and to compress the mixture in the compressor 75. A non-return valve may be provided in the pressure conduit 82 leading to the combustion chamber 83. The combustion chamber naturally has also a scavenging connection 109.

In addition to or in lieu of the direct cooling described, indirect water cooling of the engines 75 and 76 may be carried out by means of cooler 110, conduits 111 and 112, 113 and 114. A deaerating vessel 115 with return conduit 116 and if desired a circulating pump may be provided. The cooler 110 may, for example, be cooled by means of air.

The two engines 75 and 76 in order to save material costs can be combined in a common casing. Two casings for the compression and expansion pistons can be arranged independently of one another for the purpose of adjustment of the stroke in a common outer casing.

Moreover it is possible, instead of expanding steam produced by direct water spraying together with the combustion gases, to produce steam by indirect cooling of the combustion chamber to produce power in a separate expansion engine. The latter can naturally be coupled mechanically with the combustion engine.

The advantages offered by such a combustion engine over the present state of the art are considerable and consist, for example, of continuous and practically noiseless operation, lower temperature demand on the engine, a considerable saving in fuel corresponding to the efficiency of the cooling vapour on increase of the thermal efficiency.

In use of the new engine for compressing and/or expanding gaseous media it is naturally necessary to provide an additional device, not shown, for lubricating the engine. The lubricating oil is preferably supplied continuously through the shaft while an oil separator is located in the gas outlet conduit of the engine from which the oil can be returned by means of a pump. A lubricating pump can be built directly into the rotary piston engine or coupled with it.

In many cases a separate pump can be dispensed with if the oil to be returned passes into the pressure conduit of the engine and returns under its own pressure. Molybdenum di-sulphide or an equivalent auxiliary lubricant may be added to the lubricating oil in suitable quantity.

In the use of the new engine for pumping fluids which are not suitable as lubricating means and are specifically heavier or even lighter than the lubricating oil employed a small quantity of lubricant may be supplied to the suction conduit or to the shaft continuously or intermittently. The quantity of lubricant carried into the pressure conduit can also be separated and returned in an analogous manner by suitable separators, e.g. hydro cyclones.

I claim:

1. In a rotary piston pump or motor having a relatively stationary outer casing, a cylindrical piston carrier mounted within said stationary outer casing to rotate about a first axis and having radial slot means, a rotatably cylindrical casing mounted within said outer casing in surrounding relation to said cylindrical piston carrier to rotate about a second axis parallel and eccentric to said first axis and having two diametrically opposed inwardly facing plane faces normal to said radial slot means and ports opening outwardly through said rotatable cylindrical casing, sliding piston means in said radial slot means having radially outer faces in sliding engagement with said inwardly facing plane faces whereby said piston carrier, said rotatable cylindrical casing and said piston means define a plurality of arcuately shaped chambers which collectively form a ring, and mutually adjacent inlet and outlet passages in said outer casing communicable with said chambers: the improvement which comprises a pair of first plane surfaces on said piston means parallel to and radially inwardly spaced from said outer faces of said piston means, said first plane surfaces extending laterally beyond the lateral edges of said piston means in the direction of extent of said axes; and a pair of second plane surfaces in said rotatable cylindrical casing spaced radially outwardly from the axis of said rotatable cylindrical casing and being parallel to and having sliding engagement with said first plane surfaces.

2. Pump or motor construction according to claim 2 including bearings carried by said relatively stationary outer casing and mounting said rotatable cylindrical casing for rotation; a fixed casing housing said relatively stationary outer casing, said piston carrier and said rotatable cylindrical casing; adjusting means extending through said fixed casing and being connected to said relatively stationary outer casing and being operable for shifting the latter to vary the eccentricity of the axis of rotation of said rotatable cylindrical casing to the axis of said cylindrical piston carrier, inlet and outlet means in said fixed casing registering respectively with the inlet and outlet passages in said relatively stationary casing in sealed relation thereto; and bearings in said fixed casing mounting said cylindrical piston carrier for rotation.

3. Pump or motor construction according to claim 1 in which said slot means comprise two slots extending through said piston carrier and intersecting one another at an angle of 90° within said piston carrier, and said piston means comprise two pistons respectively slidable in said two slots, the widths of said pistons at their outer faces corresponding to the width of said piston carrier in the direction of the axis of rotation of said piston carrier, one of said pistons being forked shape at its central portion and the other of said pistons having a middle bar portion which extends through the forked shaped central portion of said one of said pistons.

4. A rotary piston machine according to claim 3 characterized by this that the forked part of the one piston has the same weight as the middle bar of the other.

5. Pump or motor construction according to claim 3 in which the fork shaped central portion of said one of said pistons is of the same weight as the middle bar portion of said other of said pistons, the said first plane surfaces on said pistons being provided on cross bar parts of equal weight on said pistons adjacent opposite ends thereof.

6. A rotary piston machine according to claim 5 characterized by this that the rotatable cylindrical casing consists of two casings fitting into one another each with a hollow at one side serving as a bearing in the stationary casing.

7. A rotary piston machine as claimed in claim 6 characterized by this that the rotatable cylindrical casing on its inner periphery has said inwardly facing plane faces and on its side wall bearing on the piston has grooves parallel to said inwardly facing plane faces for driving the pistons by the cross bar surfaces of the pistons.

8. A rotary piston machine as claimed in claim 7 characterized by this that a ring is provided for securing together the two halves of the rotatable cylindrical casing.

9. A rotary piston machine as claimed in claim 1 characterized by this that the rotatable cylindrical casing is mounted at both sides in the relatively stationary outer casing by means of conical roller bearings.

10. A rotary piston machine as claimed in claim 1 characterized by this that the piston carrier is rotatably mounted in a fixed outer casing by means of conical roller bearings.

11. In a rotary pump or motor having a substantially cylindrical inner element, a substantially cylindrical outer element in surrounding relation to said inner element, means mounting said elements for rotation about parallel eccentric axes, said outer element having two diametrically opposed radial slots and said inner element having two diametrically opposed plane faces normal to said radial slots, ports opening through said inner element, sliding piston means in said radial slots having faces in sliding engagement with said plane faces whereby said inner and outer elements and said piston means define a plurality of generally arcuate chambers, and inlet and outlet passages communicable with said chambers: the improvement which comprises a pair of first plane surfaces on said piston means parallel to and spaced radially inwardly from said piston means faces and extending parallel thereto; and a pair of second plane surfaces on said inner element spaced radially outwardly from the axis of said inner element and being parallel to and having sliding engagement with said first plane surfaces.

12. Pump or motor construction according to claim 11 including means for varying the eccentricity of the axes of rotation of said inner element and said outer element, said adjusting means comprising a rotatable spindle; a cam on said spindle eccentric to the axis of rotation thereof; and motion transmitting means interposed between and operatively connecting said cam to the means mounting said inner element for rotation.

13. A rotary piston machine as claimed in claim 12 characterized by this that said eccentric cam engages in a corresponding bore in a block which is movable in a slot provided on one part of the parallelly guided carrier of the inner element.

14. A rotary piston machine as claimed in claim 12 including a hollow shaft providing said inlet and outlet passages and extending through said inner element, said spindle extending through said inlet passage in said hollow shaft.

15. Pump or motor construction according to claim 11 in which said piston means are of such weight in relation to one another that forces created by their movements in the associated slots are substantially balanced.

16. A rotary piston machine as claimed in claim 11 characterized by this that said cylindrical inner element is rotatably mounted on said outer element by means including antifriction bearings.

17. A rotary piston machine as claimed in claim 11 characterized by this that said outer element is mounted at both sides by means of antifriction bearings.

18. In a rotary pump or motor having a substantially cylindrical inner element, a substantially cylindrical outer element in surrounding relation to said inner element, means mounting said elements for rotation about parallel eccentric axes, one of said elements having two diametrically opposed radial slot means and the other of said elements having two diametrically opposed plane faces normal to said radial slot means, ports opening through said other of said elements, sliding piston means in said radial slot means having faces in sliding engagement with said plane faces whereby said inner and outer elements and said piston means define a plurality of generally arcuate chambers, and inlet and outlet passages communicable with said chambers: the improvement which comprises a pair of first plane surfaces on said piston means parallel to and spaced radially inwardly from said piston means faces and extending parallel thereto; and a pair of second plane surfaces on said other of said elements spaced radially outwardly from the axis of said other element and being parallel to and having sliding engagement with said first plane surfaces.

References Cited by the Examiner

UNITED STATES PATENTS

| 1,126,812 | 2/15 | McQueen | 60—53 |
| 1,269,338 | 1/18 | Tourreil | 60—53 |
| 1,505,788 | 8/24 | Larson et al. | 121—57 |
| 1,796,008 | 3/31 | Drevet | 121—57 |
| 1,943,637 | 1/34 | Sturm | 121—57 |
| 1,945,220 | 1/34 | Eyston | 121—57 X |
| 2,089,593 | 8/37 | Bailey | 121—57 X |
| 2,127,968 | 8/38 | Bailey | 121—57 |
| 2,469,097 | 5/49 | Wrenn | 103—120 |
| 2,537,349 | 1/51 | Johnson | 103—121 |
| 2,786,332 | 3/57 | Taverniers | 60—39.61 |
| 2,845,777 | 8/58 | Nilsson et al. | 60—39.61 |
| 2,895,423 | 7/59 | Shoosmith | 103—120 |
| 2,928,295 | 3/60 | Boulanger | 60—53 |
| 3,021,673 | 2/62 | Mock | 60—39.55 |
| 3,038,308 | 6/62 | Fuller | 60—39.55 |
| 3,073,118 | 1/63 | August | 60—39.61 |

FOREIGN PATENTS

| 327,119 | 3/30 | Great Britain. |
| 562,441 | 7/44 | Great Britain. |

KARL J. ALBRECHT, *Primary Examiner.*

JOSEPH J. BRANSON, Jr., *Examiner.*